US012608144B2

(12) United States Patent
Salvadore et al.

(10) Patent No.: US 12,608,144 B2
(45) Date of Patent: Apr. 21, 2026

(54) STORAGE-DRIVEN POWER OPTIMIZATION

(71) Applicant: Dell Products L.P., Round Rock, TX (US)

(72) Inventors: James Salvadore, Amherst, NH (US); Michael Salerno, Jr., Temple, NH (US); Luc Poulin, Charlton, MA (US); Paul Martin, Clonakilty (IE)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/327,371

(22) Filed: Jun. 1, 2023

(65) Prior Publication Data

US 2024/0402918 A1     Dec. 5, 2024

(51) Int. Cl.
G06F 3/06          (2006.01)

(52) U.S. Cl.
CPC ............ G06F 3/0625 (2013.01); G06F 3/061 (2013.01); G06F 3/0653 (2013.01); G06F 3/0679 (2013.01)

(58) Field of Classification Search
CPC ...... G06F 3/0625; G06F 3/061; G06F 3/0653; G06F 3/0679
See application file for complete search history.

(56) References Cited

U.S. PATENT DOCUMENTS

| | | | | |
|---|---|---|---|---|
| 9,280,200 | B1 * | 3/2016 | Glassburn | G06F 1/3275 |
| 2008/0178029 | A1 * | 7/2008 | McGrane | G06F 1/3246 |
| | | | | 713/320 |
| 2010/0011368 | A1 * | 1/2010 | Arakawa | G06F 3/0665 |
| | | | | 711/170 |
| 2018/0027058 | A1 * | 1/2018 | Balle | H04L 69/04 |
| 2018/0101214 | A1 * | 4/2018 | Mahindru | G06F 9/5094 |
| 2019/0094938 | A1 * | 3/2019 | Tidwell | G06F 1/324 |
| 2023/0401005 | A1 * | 12/2023 | Muthiah | G06F 3/0688 |
| 2024/0311053 | A1 * | 9/2024 | He | G06F 3/0659 |

* cited by examiner

*Primary Examiner* — Michael Krofcheck
(74) *Attorney, Agent, or Firm* — DALY, CROWLEY, MOFFORD & DURKEE, LLP

(57)          ABSTRACT

An example methodology includes, by a computing device, polling a power monitoring device coupled to a storage system for power consumption by the storage system and whether the power consumption exceeds a power consumption threshold. The method also includes, responsive to a determination that the power consumption exceeds the power consumption threshold, managing, by the computing device, the power consumption by the storage system to cause the power consumption to not exceed the power consumption threshold.

18 Claims, 5 Drawing Sheets

400

STORAGE-DRIVEN POWER OPTIMIZATION

BACKGROUND

Data centers are facilities that organizations use to house the computing and other electrical equipment needed to support their applications and data. A typical data center may contain thousands of racks which house the servers, storage systems, and other systems and equipment, which all consume power. With the growth of digital data and the increasing demand for cloud computing, data centers are consuming more power than ever before.

SUMMARY

This Summary is provided to introduce a selection of concepts in simplified form that are further described below in the Detailed Description. This Summary is not intended to identify key or essential features or combinations of the claimed subject matter, nor is it intended to be used to limit the scope of the claimed subject matter.

In accordance with one illustrative embodiment provided to illustrate the broader concepts, systems, and techniques described herein, a method includes, by a computing device, polling a power monitoring device coupled to a storage system for power consumption by the storage system and determining whether the power consumption exceeds a power consumption threshold. The method also includes, responsive to a determination that the power consumption exceeds the power consumption threshold, managing, by the computing device, the power consumption by the storage system to cause the power consumption to not exceed the power consumption threshold.

In some embodiments, managing the power consumption by the storage system includes power throttling of one or more components of the storage system.

In some embodiments, managing the power consumption by the storage system includes throttling host input/output (I/O) to one or more workloads at the storage system. In one such embodiment, the one or more workloads being determined based on a service tier assigned to each of the one or more workloads.

In some embodiments, managing the power consumption by the storage system includes performing one of a failover or a migration of one or more workloads at the storage system to another storage system. In one such embodiment, the one or more workloads being determined based on a service tier assigned to each of the one or more workloads.

According to another illustrative embodiment provided to illustrate the broader concepts described herein, a system includes one or more non-transitory machine-readable mediums configured to store instructions and one or more processors configured to execute the instructions stored on the one or more non-transitory machine-readable mediums. Execution of the instructions causes the one or more processors to carry out a process including polling a power monitoring device coupled to a storage system for power consumption by the storage system and determining whether the power consumption exceeds a power consumption threshold. The process also includes, responsive to a determination that the power consumption exceeds the power consumption threshold, managing the power consumption by the storage system to cause the power consumption to not exceed the power consumption threshold.

According to another illustrative embodiment provided to illustrate the broader concepts described herein, a non-transitory machine-readable medium encodes instructions that when executed by one or more processors cause a process to be carried out, the process including polling a power monitoring device coupled to a storage system for power consumption by the storage system and determining whether the power consumption exceeds a power consumption threshold. The process also includes, responsive to a determination that the power consumption exceeds the power consumption threshold, managing the power consumption by the storage system to cause the power consumption to not exceed the power consumption threshold.

It should be appreciated that individual elements of different embodiments described herein may be combined to form other embodiments not specifically set forth above. Various elements, which are described in the context of a single embodiment, may also be provided separately or in any suitable sub-combination. It should also be appreciated that other embodiments not specifically described herein are also within the scope of the claims appended hereto.

BRIEF DESCRIPTION OF THE DRAWINGS

The foregoing and other objects, features and advantages will be apparent from the following more particular description of the embodiments, as illustrated in the accompanying drawings in which like reference characters refer to the same parts throughout the different views. The drawings are not necessarily to scale, emphasis instead being placed upon illustrating the principles of the embodiments.

DETAILED DESCRIPTION

High power consumption of data centers provides major challenges. With energy costs continually rising, data center customers are looking for ways to place limits on data center power consumption to maintain and reduce their operating costs. One common question asked by customers is how they can cap power consumption at a certain limit while not impacting the performance of their critical workloads. The rising costs of energy have also placed the power consumption of data centers in the cross hairs of the utilities and local governments, threatening their future growth and profitability with increased regulations and soaring utility costs. The primary challenges data centers face regarding power consumption and power costs include increasing workload power demands, cooling costs, energy efficiency, and regulatory compliance. In summary, data centers are confronted with the significant challenges of maintaining performance profiles for critical applications while also managing power consumption and power costs.

Disclosed herein are concepts, structures, and techniques for storage-driven power optimization. This can be achieved by using the storage system as the primary driver to maintain performance profiles for critical application workloads while optimizing power consumption along the data path. In some embodiments, a storage system can throttle and/or offload workloads when predetermined power consumption thresholds for the storage system are exceeded. In some embodiments, a storage system can throttle and/or offload workloads based on service tiers assigned to the workloads. Since storage is the terminus of the data path, reductions in power consumption at the storage system) can have upstream power reduction effects on the other components in the data path such as switches and workload servers. In other words, the increased efficiency of the storage system resulting from the reduction in power consumption can also result in increased efficiency of the upstream components in the data path. Numerous configurations and variations will be apparent in light of this disclosure.

As used herein, the term "storage system" refers, in addition to its ordinary meaning, to the hardware and software components used to store and manage data. A storage system can include, for example, dedicated storage hardware that contains spinning hard disk drives (HDDs), solid-state drives (SSDs), flash drives, tape libraries, disk-based backup systems, and cloud-based storage services. In addition to the hardware components, a storage system can also include software components used to manage and protect the data stored within the storage system, such as software defined storage systems, file systems, storage management tools, and data protection and recovery software.

Figure 1:
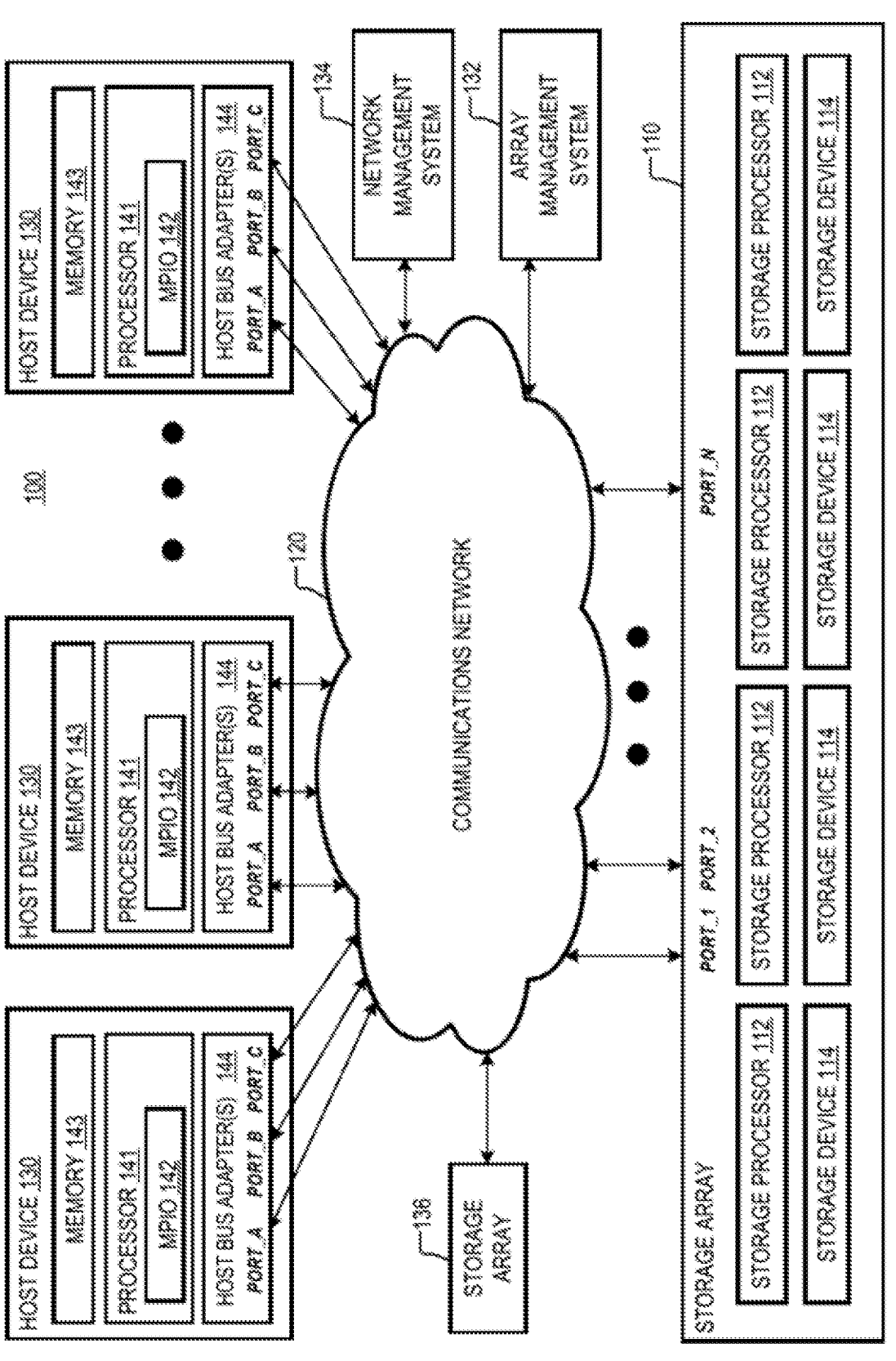
FIG. 1 is a block diagram of an illustrative storage system within which embodiments of the present disclosure may be utilized.

FIG. 1 is a diagram of an example of a storage system 100 within which embodiments of the present disclosure may be utilized. As illustrated, system 100 may include a storage array 110, a communications network 120, a plurality of host devices 130, an array management system 132, a network management system 134, and a storage array 136.

Storage array 110 may include a plurality of storage processors 112 and a plurality of storage devices 114. Each of the storage processors 112 may include a computing device that is configured to receive I/O requests from any of the host devices 130 and execute the received I/O requests by reading or writing data to storage devices 114. In some implementations, each of the storage processors 112 may have an architecture that is the same or similar to the architecture of a computing device 500 of FIG. 5. Storage processors 112 may be located in the same geographic location or in different geographic locations. Similarly, storage devices 114 may be located in the same geographic location or different geographic locations. Each of the storage devices 114 may include any of a solid-state drive (SSD), a non-volatile random-access memory (nvRAM) device, a non-volatile memory express (NVME) device, a hard disk (HD), and/or any other suitable type of storage device. In some implementations, storage devices 114 may be arranged in one or more Redundant Array(s) of Independent Disks (RAID) arrays. Communications network 120 may include one or more of the Internet, a local area network (LAN), a wide area network (WAN), a fibre channel (FC) network, and/or any other suitable type of network.

Each of the host devices 130 may include a laptop, a desktop computer, a smartphone, a tablet, an Internet-of-Things device, and/or any other suitable type of electronic device that is configured to retrieve and store data in storage arrays 110 and 136. Each host device 130 may include a memory 143, a processor 141, and one or more host bus adapters (HBAs) 144. Memory 143 may include any suitable type of volatile and/or non-volatile memory, such as a solid-state drive (SSD), a hard disk (HD), a random-access memory (RAM), a Synchronous Dynamic Random-Access Memory (SDRAM), etc. Processor 141 may include any suitable type of processing circuitry, such as a general-purpose process (e.g., an x86 processor, a MIPS processor, an ARM processor, etc.), a special-purpose processor, an application-specific integrated circuit (ASIC), a field programmable gate array (FPGA), etc. Each of the HBAs 144 may be a circuit board or integrated circuit adapter that connects a respective one of the host devices 130 to storage array 110 (and/or storage array 136). In other words, each of the HBAs 144 may include a communications interface for connecting to communications network 120, storage array 110, and/or storage array 136. Although in the example of FIG. 1 each of the host devices 130 is provided with at least one HBA 144, alternative implementations are possible in which each of the host devices is provided with another type of communications interface, in addition to (or instead of) an HBA. The other type of communications interface may include one or more of an Ethernet adapter, a WiFi adapter, a local area network (LAN) adapter, etc.

Each processor 141 may be configured to execute a multi-path I/O (MPIO) driver 142. MPIO driver 142 may comprise, for example, PowerPath™ drivers from Dell Technologies™, and/or other types of MPIO drivers that are arranged to discover available communications paths with any of the host devices 130 and the storage array 110. MPIO driver 142 may be configured to select I/O operations from any of the I/O queues of host devices 130. The sources of the I/O operations stored in the I/O queues may include respective processes of one or more applications executing on host devices 130.

HBA 144 of each of the host devices 130 may include one or more ports. Specifically, in the example of FIG. 1, HBA 144 of each of the host devices 130 includes three ports, which are herein enumerated as "port A", "port B", and "port C". Furthermore, storage array 110 may also include a plurality of ports. In the example of FIG. 1, the ports in storage array 110 are enumerated as "port 1", "port 2," and "port N", where N is a positive integer greater than 2. Each of the ports in host devices 130 may be coupled to one of the ports of the storage array via a corresponding network path. The corresponding network path may include one or more hops in communications network 120. Under the nomenclature of the present disclosure, a network path spanning between an HBA port of one of host devices 130 and one of the ports of the storage array 110 is referred to as a "network path of that host device 130".

Figure 5:
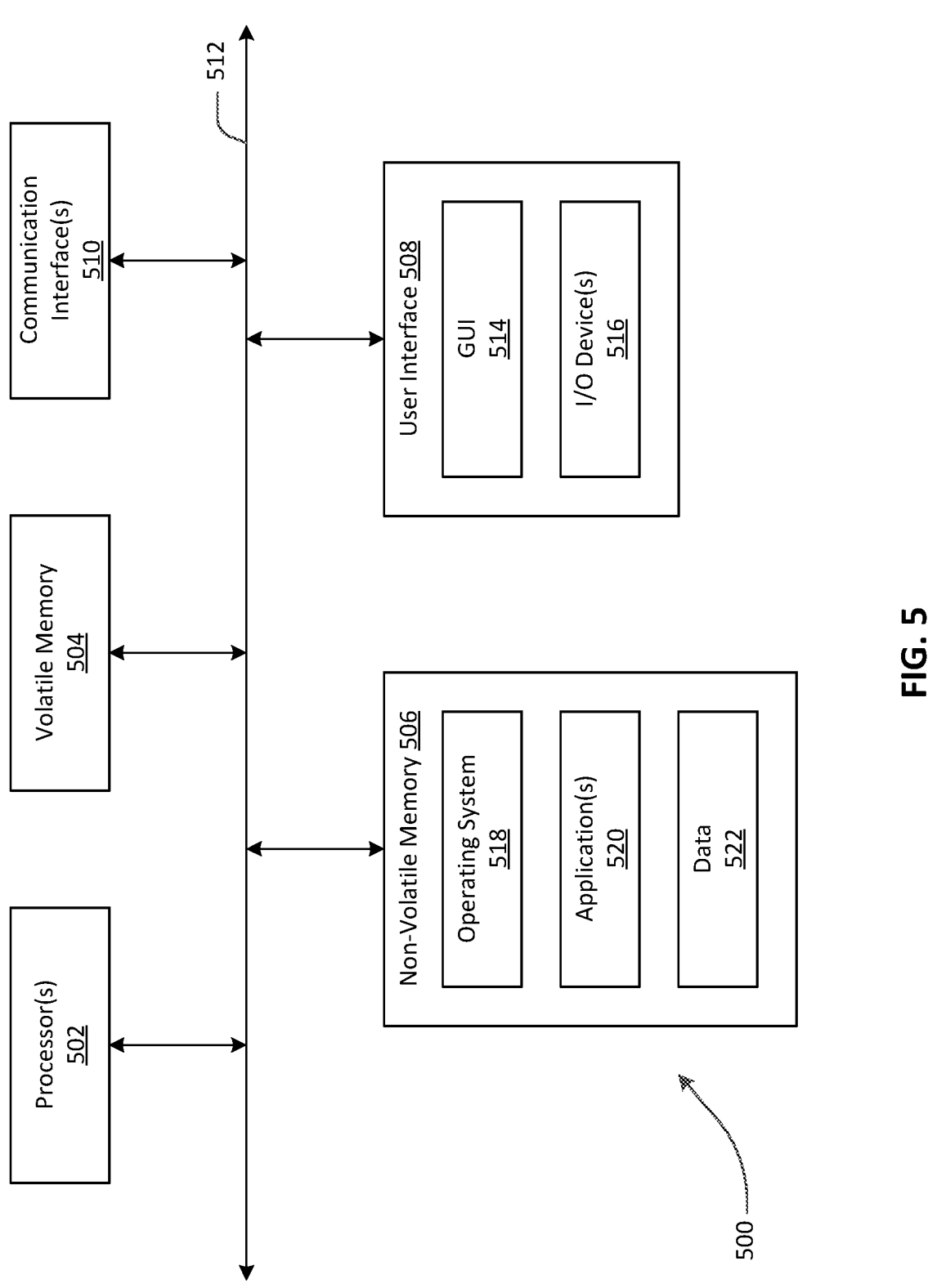
FIG. 5 is a block diagram illustrating selective components of an example computing device in which various aspects of the disclosure may be implemented, in accordance with an embodiment of the present disclosure.

Array management system 132 may include a computing device, such as computing device 500 of FIG. 5. Array management system 132 may be used by a system administrator to re-configure storage array 110, e.g., when degraded performance of storage array 110 is detected.

Network management system 134 may include a computing device, such as computing device 500 of FIG. 5. Network management system 134 may be used by a network administrator to configure communications network 120 when degraded performance of communications network 120 is detected.

Storage array 136 may be the same or similar to storage array 110. Storage array 136 may be configured to store the same data as storage array 110. Storage array 136 may be configured to operate in either active-active configuration with storage array 110 or in active-passive configuration. When storage arrays 110 and 136 operate in active-active configuration, a write request to either of storage arrays 110 and 136 is not acknowledged back to the sender until the data associated with the write request is written to both of the storage arrays 110 and 136. When storage arrays 110 and 136 are operated in active-passive configuration, a write request to a given one of the storage arrays 110 and 136 is acknowledge for as long the data associated with write request is written to the given one of the storage arrays 110 and 136 before the writing to the other one of the storage arrays is completed.

Figure 2:
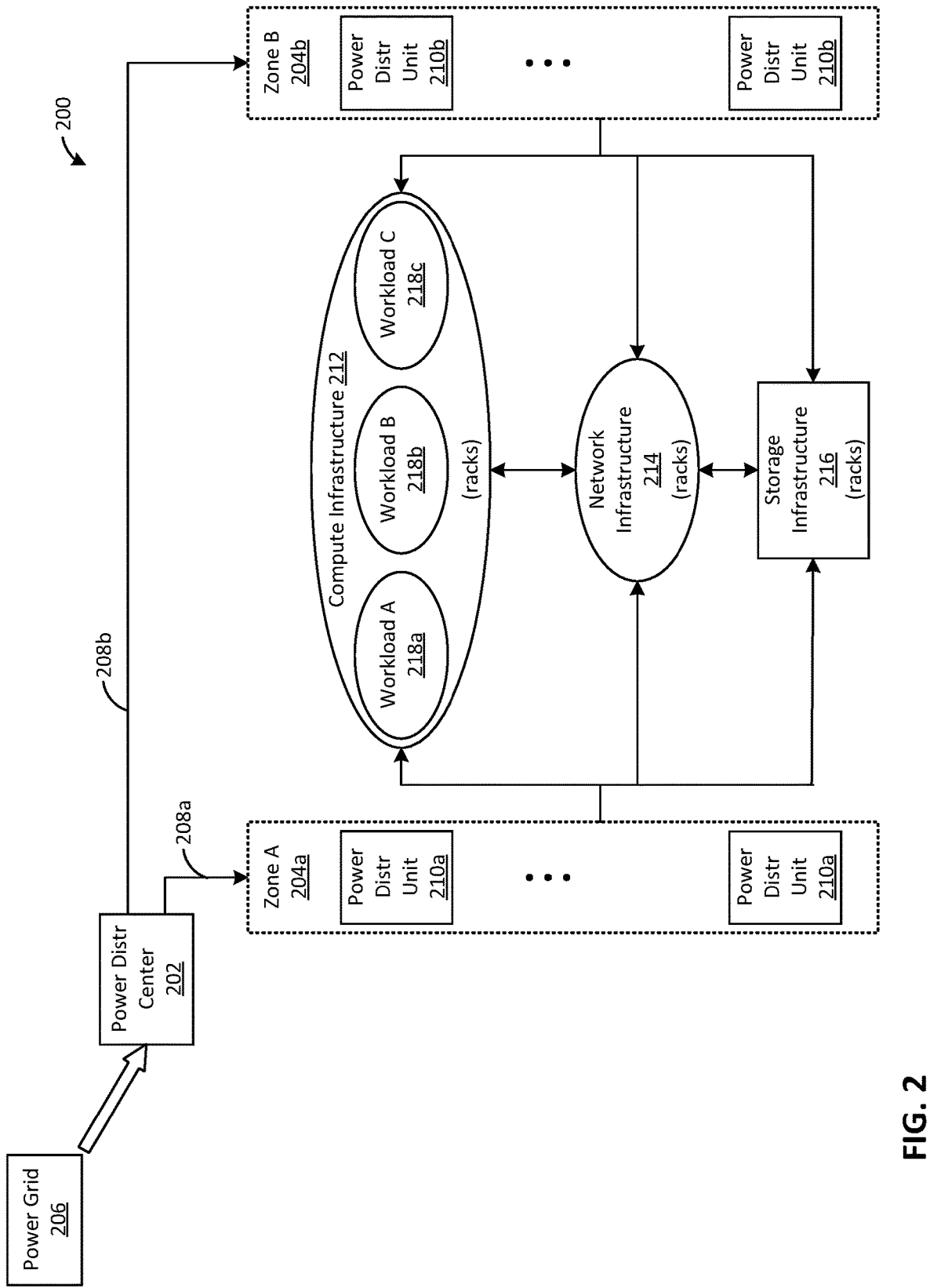
FIG. 2 is a diagram illustrating an example datacenter power infrastructure, in accordance with an embodiment of the present disclosure.

Referring now to FIG. 2, shown is a diagram illustrating an example datacenter power infrastructure, in accordance with an embodiment of the present disclosure. As shown, a data center 200 includes a power distribution center 202 and power zones 204a, 204b. In at least one embodiment, power zones 204a, 204b may be redundant power zones.

Power distribution center 202 is operable to provide data center 200 with a consistent and uninterrupted source of power. As shown, power distribution center 202 may receive the power from a power grid 206. Power grid 206 may include an interconnected network for the delivery of electricity from producers of electricity (power stations) to consumers, such as data center 200. Power distribution center 202 can be understood to be the primary entry point and distribution point of grid/non-grid power into data center 200. Power distribution center 202 may be composed of a series of transformers, uninterrupted power supplies (UPS), backup generators, switch gear, charge controllers, and breakers.

Power distribution center 202 may provide power mains 208a, 208b into data center 200. As shown, power main 208a is provided to power zone 204a, and power main 208b is provided to power zone 204b. Power zone 204a includes one or more power distribution units 210a (210 generally) and power zone 204b includes one or more poser distribution units 210b (210 generally). Power distribution unit 210 is operable to control and distribute the incoming power from power distribution center 202 to a compute infrastructure 212, a network infrastructure 214, and a storage infrastructure 216 within data center 200. In the example of FIG. 2, power distribution units 210a may distribute power main 208a to compute infrastructure 212, network infrastructure 214, and storage infrastructure 216. Similarly, power distribution units 210b may distribute power main 208b to compute infrastructure 212, network infrastructure 214, and storage infrastructure 216. In this way, in case of a failure of either power main 208a or power main 208b, the non-failed power main can provide power to supply the loads required by the components, such as, for example, servers, switches, and storage systems, within infrastructures 212, 214, 216.

The components within the individual infrastructures 212, 214, 216 may be deployed in scalable units known as racks. The racks may be enclosures (e.g., steel enclosures) and are standardized into units of measure called rack units (U). The racks may be attached to redundant power mains and distribute the power mains to the redundant internal power supplies of the components in the racks. For example, the individual racks in infrastructures 212, 214, 216 may receive power main 208a from one power distribution unit 210a in power zone 204a and power main 208b from one power distribution unit 210b in power zone 204b. The individual racks can then distribute the received power mains 208a, 208b to the redundant internal power supplies of the components in the rack.

Compute infrastructure 212 may include the computing systems (e.g., servers) that are used to perform calculations, execute programs, and process data generated by application workloads. The processing power of the computing systems may be measured in terms of the number of processing cores or central processing units (CPUs) in a system, as well as the clock speed of the CPUs and the amount of memory (e.g., RAM) available. More powerful computing systems may have more processing cores, higher clock speeds, and/or more memory, which allows them to perform more complex calculations and process larger amounts of data more quickly. However, the more powerful computing systems require more power. Compute infrastructure 212 may be the most power intensive infrastructure in data center 200.

As shown, compute infrastructure 212 may include workloads 218a, 218b, 218c (218 generally). Workload 218 may be a specific task or set of tasks that require significant processing power to complete. Workloads 218 can be classified into different categories based on their compute requirements, such as, for example, CPU-bound workloads (e.g., workloads that need a lot of processing power from the CPU to complete, but not a lot of memory or I/O bandwidth), memory-bound workloads (e.g., workloads that need a lot of memory bandwidth to complete, but not a lot of compute power or I/O bandwidth), I/O-bound workloads (e.g., workloads that need a lot of I/O bandwidth to complete, but not a lot of compute power or memory bandwidth), and graphics processing unit (GPU)-bound workloads (e.g., workloads that need a lot of processing power from the GPU to complete, such as tasks related to graphics rendering or machine learning). In any case, workloads 218 can impact and, in some cases, significantly impact power consumption in the computer systems. The amount of power consumed by a computer system may be directly proportional to the amount of work being performed, and compute-intensive workloads 218 can require higher levels of processing power, which can lead to higher power consumption.

In some embodiments, the individual workloads 218 may be assigned service tiers, which represent a priority level assigned to the workload. In one embodiment, data center 200 may provide a user interface (e.g., network management system 134 of FIG. 1) with which an operator of data center 200 can assign a service tier to the individual workloads 218. In such embodiments, the operator may assign the service tiers to the individual workloads 218 based on service level agreements (SLAs) entered with the various customers of data center 200. The service tiers assigned to workloads 218 can then be used to provide the appropriate allocation resources when power consumption limits are exceeded. That is, the service tiers can be used to determine the workload management actions that are to be applied when power consumption limits are exceeded.

In the example of FIG. 2, workload 218a may be assigned a "Gold" service tier, workload 218b may be assigned a "Silver" service tier, and workload 218c may be assigned a "Bronze" service tier. The Bronze service tier may represent the lowest priority and the Gold service tier may represent the highest priority. When power consumption limits are exceeded, workload management actions (e.g., throttle, off-load, migrate, failover, etc.) may be applied to the workloads assigned to the Bronze service tier or Silver service tier to lower (e.g., bring down) the power consumption to be within predetermined power consumption thresholds (e.g., within acceptable power consumption limits). For example, one or more workload management actions may be defined specifying that Bronze service tier workloads (e.g., workload 218c) can be acted on (e.g., performance throttled) when power consumption exceeds a first power consumption threshold (e.g., 85% of system maximums), Silver service tier workloads (e.g., workload 218b) can be acted on (e.g., performance throttled) when power consumption exceeds a second power consumption threshold (e.g., 95% of system maximums), and Gold service tier workloads (e.g., workload 218*a*) cannot be acted on under any circumstances.

In some embodiments, data center 200 may provide a user interface (e.g., network management system 134 of FIG. 1) with which the operator of data center 200 can specify the power consumption thresholds and define the one or more workload management actions to be applied to the workloads based on the assigned service tiers.

Network infrastructure 214 is operable to provide the data path communication between compute infrastructure 212 (e.g., initiators) and storage infrastructure 216 (e.g., targets). Network infrastructure 214 may include devices such as switches, routers, gateways, and network interface cards (NICs), as well as communication channels such as Ethernet cables, fiber optic cables, and/or wireless connections. Network infrastructure 214 may use different protocols and software that enable devices to communicate with each other, such as Transmission Control Protocol/Internet Protocol (TCP/IP), Fibre Channel, and InfiniBand.

Storage infrastructure 216 may include the storage systems used to store and manage data in data center 200. The storage systems in storage infrastructure 216 may be designed to provide high capacity, reliability, and performance for storing and accessing data and, in some cases, large amounts of data by workloads 218 (e.g., the application workloads). In some embodiments, the storage systems may provide power management features, such as power capping or dynamic power management, which may be used to reduce power consumption by the storage systems. In some embodiments, the power management features provided by the storage systems may also include, for example, power throttling of storage system components, such as CPUs, fans, and nodes.

In some embodiments, power distribution unit 210 may be configured to provide power consumption metrics such as an input wattage (i.e., wattage input to power distribution unit 210) as well as other data about the input wattage. For example, power distribution unit 210 may provide an application programming interface (API), such as a REDFISH API, which can be used to obtain the power consumption metrics from power distribution unit 210. For example, the API may be used by other devices to poll power distribution unit 210 for power consumption metrics. In some embodiments, power distribution unit 210 may be configured to send alerts or notifications when power consumption exceeds predetermined power consumption thresholds. For example, power distribution unit 210 can send the alters via the API and network protocols such as Simple Network Management Protocol (SNMP).

Figure 3:
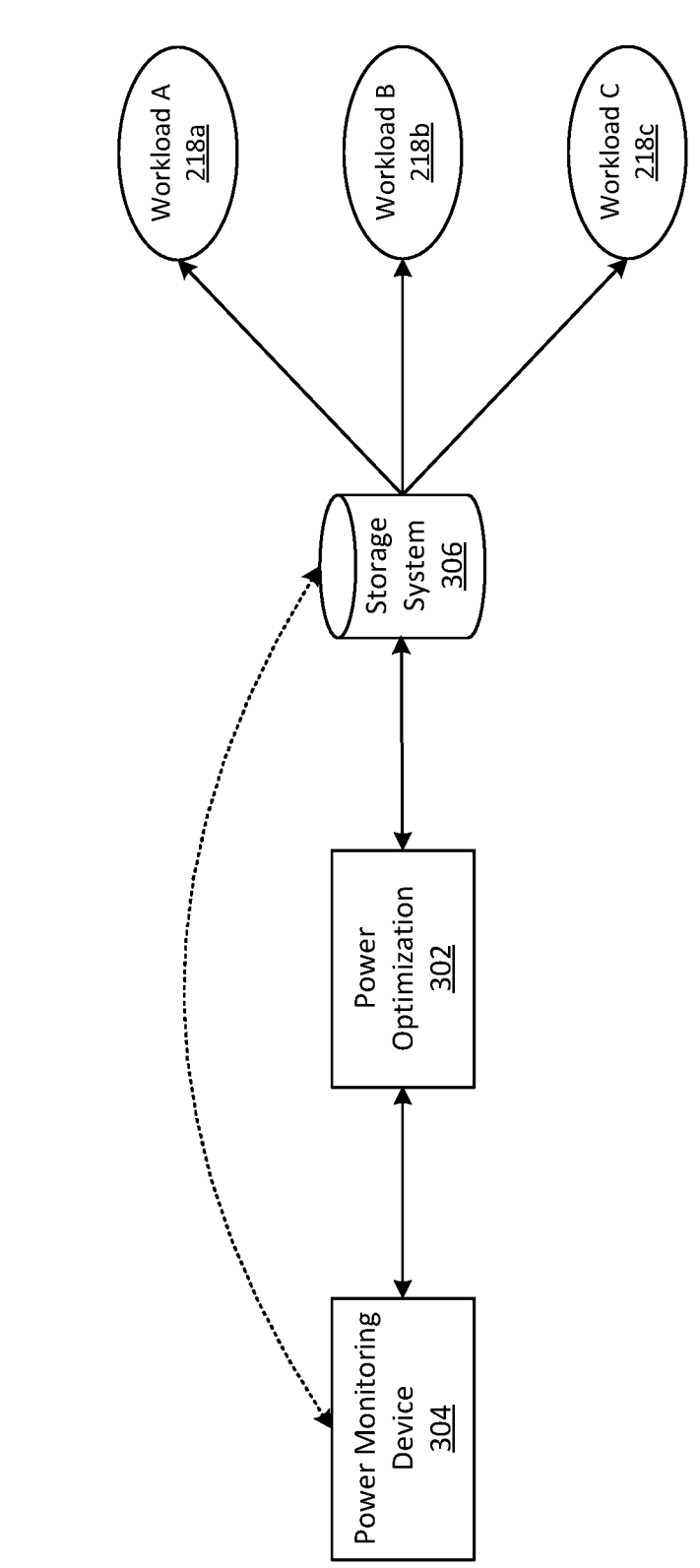
FIG. 3 is a block diagram of an illustrative computing environment configured to manage storage system power consumption, in accordance with an embodiment of the present disclosure.

Referring now to FIG. 3 and with continued reference to FIG. 2, shown is a block diagram of an illustrative computing environment 300 configured to manage storage system power consumption, in accordance with an embodiment of the present disclosure. As shown, illustrative computing environment 300 includes a power optimization module 302 communicably coupled to a power monitoring device 304 via a network (not shown). The communication network can include, for example, the Internet, LANs, WANs, FC networks, etc. In some embodiments, power monitoring device 304 may correspond to a particular power distribution unit 210 of FIG. 2. In other embodiments, power monitoring device 304 may correspond to a power monitoring device implemented within or as a component of a storage system such as a storage system 306. In any case, power monitoring device 304 may be configured to provide data about the power consumption by storage system 306 (as indicated by the dotted directional line). That is, power monitoring device 304 may be configured to provide data about the power (e.g., kilowatts (kW)) being input to storage system 306. While only one power monitoring device 304 is depicted in FIG. 3 for purposes of clarity, it will be appreciated that other power monitoring devices 304 may be communicably coupled to power optimization module 302.

In the example of FIG. 3, power optimization module 302 may poll power monitoring device 304 for the power consumption by storage system 306 on a continuous or periodic basis (e.g., according to a predetermined schedule specified by the operator of the data center). In embodiments where power monitoring device corresponds to power distribution unit 210, power optimization module 302 may poll power monitoring device 304 for the wattage being input to power monitoring device 304 (e.g., the input wattage to power distribution unit 210). The wattage input to power distribution unit 210 may represent the power consumption by storage system 306. Upon receiving the power consumption data, power optimization module 302 may manage the power consumption by storage system 306 based on the power consumption data, predetermined power consumption thresholds, and/or the workload management actions to be applied to the workloads at storage system 306. To this end, storage system 306 may provide an API, such as a representational state transfer (REST)-based API, which can be used to call storage system 306 to invoke tasks, such as, for example, I/O throttles, migrations, and failovers, among others.

As an example, a workload management action may specify power throttling of one or more components of storage system 306 if the power consumption by storage system 306 exceeds a predetermined power consumption threshold (e.g., throttle power to components, such as CPUs, fans, and/or nodes, of storage system 306 if the power consumption exceeds 80% of storage system 306 maximum value of 15 kW). As another example, a workload management action may specify throttling host I/O to one or more workloads at storage system 306. The workloads that are to be throttled may be based on the service tiers assigned to the workloads. For example, suppose workloads 218*a*, 218*b*, 218*c* are at storage system 306. In this example, one workload management action may specify throttling host I/O to workload 218*c* assigned to the Bronze service tier if the power consumption exceeds 80% of storage system 306 maximum value of 15 kW, and another workload management action may specify throttling host I/O to workload 218*c* assigned to the Bronze service tier and workload 218*b* assigned to the Silver service tier if the power consumption exceeds 90% of storage system 306 maximum value of 15 kW. As still another example, a workload management action may specify performing a failover of one or more workloads at storage system 306 to another storage system (e.g., to a storage system which has lower power consumption). The workloads to failover may be based on the service tiers assigned to the workloads. For example, one workload management action may specify performing a failover of workload 218*c* assigned to the Bronze service tier if the power consumption exceeds 85% of storage system 306 maximum value of 15 kW, and another workload management action may specify performing a failover of workload 218*c* assigned to the Bronze service tier and workload 218*b* assigned to the Silver service tier if the power consumption exceeds 95% of storage system 306 maximum value of 15 kW. In any case, power optimization module 302 may apply the applicable workload management action(s) to lower the power consumption by storage system 306 to be within the predetermined power consumption thresholds.

Figure 4:
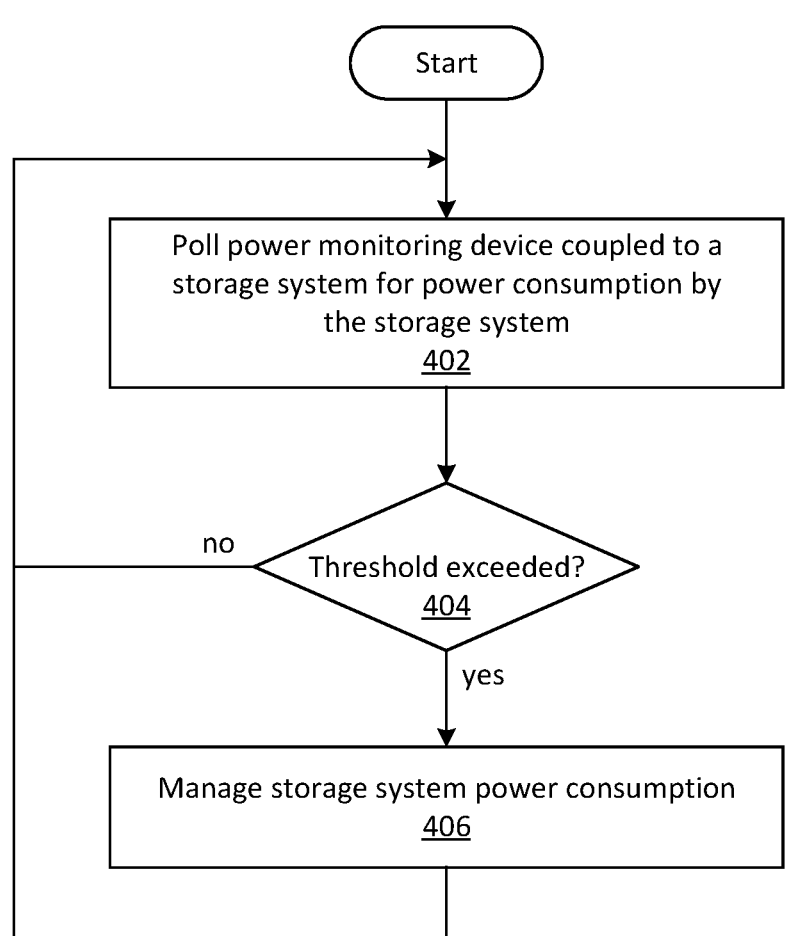
FIG. 4 is a flow diagram of an example process for managing storage system power consumption, in accordance with an embodiment of the present disclosure.

FIG. 4 is a flow diagram of an example process 400 for managing storage system power consumption, in accordance with an embodiment of the present disclosure. Illustrative process 400 may be implemented, for example, within the data center described above with respect to FIG. 2 and/or the environment described above with respect to FIG. 3.

With reference to process 400 of FIG. 4, at 402, a power monitoring device coupled to a storage system may be polled for power consumption by the storage system. For example, a power optimization module (e.g., power optimization module 302 of FIG. 3) may poll the power monitoring device for the power consumption by the storage system. The power optimization module may then check the power consumption by the storage system to determine whether the power consumption exceeds a predetermined power consumption threshold.

At 404, if it is determined that the power consumption does not exceed the predetermined power consumption threshold, then, at 402, polling of the power monitoring device may continue. For example, the power optimization module may continue polling of the power monitoring device.

Otherwise, if, at 404, it is determined that the power consumption does exceed the predetermined power consumption threshold, then, at 406, the storage system power consumption may be managed. For example, the power optimization module may apply one or more workload management actions to lower the power consumption by the storage system to be within the predetermined power consumption thresholds specified for the storage system, as previously described herein.

FIG. 5 is a block diagram illustrating selective components of an example computing device 500 in which various aspects of the disclosure may be implemented, in accordance with an embodiment of the present disclosure. For example, illustrative computing device 500 can perform all or part of the processes described herein. As shown, computing device 500 includes one or more processors 502, a volatile memory 504 (e.g., random access memory (RAM)), a non-volatile memory 506, a user interface (UI) 508, one or more communications interfaces 510, and a communications bus 512.

Non-volatile memory 506 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

User interface 508 may include a graphical user interface (GUI) 514 (e.g., a touchscreen, a display, etc.) and one or more input/output (I/O) devices 516 (e.g., a mouse, a keyboard, a microphone, one or more speakers, one or more cameras, one or more biometric scanners, one or more environmental sensors, and one or more accelerometers, etc.).

Non-volatile memory 506 stores an operating system 518, one or more applications 520, and data 522 such that, for example, computer instructions of operating system 518 and/or applications 520 are executed by processor(s) 502 out of volatile memory 504. In one example, computer instructions of operating system 518 and/or applications 520 are executed by processor(s) 502 out of volatile memory 504 to perform all or part of the processes described herein (e.g., processes illustrated and described with reference to FIGS.

1 through 4). In some embodiments, volatile memory 504 may include one or more types of RAM and/or a cache memory that may offer a faster response time than a main memory. Data may be entered using an input device of GUI 514 or received from I/O device(s) 516. Various elements of computing device 500 may communicate via communications bus 512.

The illustrated computing device 500 is shown merely as an illustrative client device or server and may be implemented by any computing or processing environment with any type of machine or set of machines that may have suitable hardware and/or software capable of operating as described herein.

Processor(s) 502 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

Processor 502 may be analog, digital, or mixed signal. In some embodiments, processor 502 may be one or more physical processors, or one or more virtual (e.g., remotely located or cloud computing environment) processors. A processor including multiple processor cores and/or multiple processors may provide functionality for parallel, simultaneous execution of instructions or for parallel, simultaneous execution of one instruction on more than one piece of data.

Communications interfaces 510 may include one or more interfaces to enable computing device 500 to access a computer network such as a Local Area Network (LAN), a Wide Area Network (WAN), a Personal Area Network (PAN), or the Internet through a variety of wired and/or wireless connections, including cellular connections.

In described embodiments, computing device 500 may execute an application on behalf of a user of a client device. For example, computing device 500 may execute one or more virtual machines managed by a hypervisor. Each virtual machine may provide an execution session within which applications execute on behalf of a user or a client device, such as a hosted desktop session. Computing device 500 may also execute a terminal services session to provide a hosted desktop environment. Computing device 500 may provide access to a remote computing environment including one or more applications, one or more desktop applications, and one or more desktop sessions in which one or more applications may execute.

In the foregoing detailed description, various features of embodiments are grouped together for the purpose of streamlining the disclosure. This method of disclosure is not to be interpreted as reflecting an intention that the claims require more features than are expressly recited. Rather, inventive aspects may lie in less than all features of each disclosed embodiment.

As will be further appreciated in light of this disclosure, with respect to the processes and methods disclosed herein, the functions performed in the processes and methods may be implemented in differing order. Additionally or alternatively, two or more operations may be performed at the same time or otherwise in an overlapping contemporaneous fashion. Furthermore, the outlined actions and operations are only provided as examples, and some of the actions and operations may be optional, combined into fewer actions and operations, or expanded into additional actions and operations without detracting from the essence of the disclosed embodiments.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

In the description of the various embodiments, reference is made to the accompanying drawings identified above and which form a part hereof, and in which is shown by way of illustration various embodiments in which aspects of the concepts described herein may be practiced. It is to be understood that other embodiments may be utilized, and structural and functional modifications may be made without departing from the scope of the concepts described herein. It should thus be understood that various aspects of the concepts described herein may be implemented in embodiments other than those specifically described herein. It should also be appreciated that the concepts described herein are capable of being practiced or being carried out in ways which are different than those specifically described herein.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure, and are to be construed as being without limitation to such specifically recited examples and conditions. Although illustrative embodiments of the present disclosure have been described in detail, various changes, substitutions, and alterations could be made hereto without departing from the scope of the present disclosure. Accordingly, it is intended that the scope of the present disclosure be limited not by this detailed description, but rather by the claims appended hereto.

What is claimed is:

1. A method comprising:
   polling, by a computing device, a power monitoring device coupled to a storage system for power consumption by the storage system;
   determining, by the computing device, whether the power consumption exceeds a power consumption threshold;
   defining one or more workloads in the storage system; and
   responsive to a determination that the power consumption exceeds the power consumption threshold, managing, by the computing device, the one or more workloads in the storage system based on a priority service tier assigned to each of the one or more workloads, including applying, for each workload, a storage input/output (I/O) rate limit specified by its priority service tier, wherein managing the one or more workloads reduces the power consumption to below the power consumption threshold.

2. The method of claim 1, wherein the power monitoring device is external to the storage system.

3. The method of claim 1, wherein the power monitoring device is internal to the storage system.

4. The method of claim 1, further comprising managing the power consumption by the storage system by power throttling of one or more components of the storage system.

5. The method of claim 1, wherein managing the one or more workloads in the storage system includes throttling host input/output (I/O) to the one or more workloads at the storage system.

6. The method of claim 1, wherein the priority service tiers assigned to each of the one or more workloads includes one of three priority levels.

7. The method of claim 1, wherein managing the one or more workloads in the storage system includes performing one of a failover or a migration of the one or more workloads at the storage system to another storage system.

8. A system comprising:
   one or more non-transitory machine-readable mediums configured to store instructions; and
   one or more processors configured to execute the instructions stored on the one or more non-transitory machine-readable mediums, wherein execution of the instructions causes the one or more processors to carry out a process comprising:

polling a power monitoring device coupled to a storage system for power consumption by the storage system;

determining whether the power consumption exceeds a power consumption threshold;

defining one or more workloads in the storage system; and responsive to a determination that the power consumption exceeds the power consumption threshold, managing the one or more workloads in the storage system based on a priority service tier assigned to each of the one or more workloads, including applying, for each workload, a storage input/output (I/O) rate limit specified by its priority service tier, wherein managing the one or more workloads reduces the power consumption to below the power consumption threshold.

9. The system of claim 8, wherein the power monitoring device is external to the storage system.

10. The system of claim 8, wherein the power monitoring device is internal to the storage system.

11. The system of claim 8, further comprising managing the power consumption by the storage system by power throttling of one or more components of the storage system.

12. The system of claim 8, wherein managing the one or more workloads in the storage system includes throttling host input/output (I/O) to the one or more workloads at the storage system.

13. The system of claim 8, wherein the priority service tiers assigned to each of the one or more workloads includes one of three priority levels.

14. The system of claim 8, wherein managing the one or more workloads in the storage system includes performing one of a failover or a migration of the one or more workloads at the storage system to another storage system.

15. A non-transitory machine-readable medium encoding instructions that when executed by one or more processors cause a process to be carried out, the process including:

polling a power monitoring device coupled to a storage system for power consumption by the storage system;

determining whether the power consumption exceeds a power consumption threshold;

defining one or more workloads in the storage system; and responsive to a determination that the power consumption exceeds the power consumption threshold, performing a failover of the one or more workloads in the storage system based on a priority service tier assigned to each of the one or more workloads, including applying for each workload, a storage input/output (I/O) rate limit specified by its priority service tier, wherein performing a failover of the one or more workloads reduces the power consumption to below the power consumption threshold.

16. The machine-readable medium of claim 15, further comprising managing the power consumption by the storage system includes power throttling of one or more components of the storage system.

17. The machine-readable medium of claim 15, wherein managing the one or more workloads in the storage system includes throttling host input/output (I/O) to the one or more workloads at the storage system, wherein the priority service tiers assigned to each of the one or more workloads includes one of three priority levels.

18. The machine-readable medium of claim 15, wherein the priority service tiers assigned to each of the one or more workloads includes one of three priority levels.

*     *     *     *     *